United States Patent
Soltysiak et al.

(12) 
(10) Patent No.: US 6,775,237 B2
(45) Date of Patent: Aug. 10, 2004

(54) METHODS AND APPARATUS FOR BURST TOLERANT EXCESSIVE BIT ERROR RATE ALARM DETECTION AND CLEARING

(75) Inventors: Edward Soltysiak, Orange, CT (US); Kumar Shakti Singh, New Delhi (IN); Pawan Goyal, New Delhi (IN)

(73) Assignee: Transwitch Corp., Shelton, CT (US)

( * ) Notice: Subject to any disclaimer, the term of this patent is extended or adjusted under 35 U.S.C. 154(b) by 450 days.

(21) Appl. No.: 09/912,086

(22) Filed: Mar. 29, 2001

(65) Prior Publication Data

US 2003/0021234 A1 Jan. 30, 2003

(51) Int. Cl.[7] ............................................. H04B 7/208
(52) U.S. Cl. ....................... 370/241; 370/244; 370/907; 375/224; 714/48; 714/704
(58) Field of Search ................................ 370/241, 242, 370/243, 244, 246, 250, 252, 395.51, 907; 375/224; 714/100, 2, 25, 48, 704, 708

(56) References Cited

U.S. PATENT DOCUMENTS

| | | | |
|---|---|---|---|
| 3,916,379 A | 10/1975 | Dulane | 340/146.1 |
| 5,138,616 A | 8/1992 | Wagner, Jr. | 371/5.1 |
| 5,467,341 A | 11/1995 | Matsukanee et al. | 370/17 |
| 5,570,373 A | 10/1996 | Wing | 371/5.1 |
| 5,627,837 A * | 5/1997 | Gillett | 714/708 |
| 5,724,362 A | 3/1998 | Lau | 371/5.1 |
| 5,764,651 A * | 6/1998 | Bullock et al. | 714/708 |
| 5,867,096 A * | 2/1999 | Park | 340/507 |
| 6,310,911 B1 * | 10/2001 | Burke et al. | 375/224 |

OTHER PUBLICATIONS

Bellcore document TR–NWT–000253 entitled "Synchronous optical network (SONET) Transport Systems: Common Generic Criteria", Telecordia Technologies, GR–253–CORE, Issue 3, Sep. 2000.

* cited by examiner

*Primary Examiner*—Frank Duong
(74) *Attorney, Agent, or Firm*—Gordon & Jacobson, P.C.

(57) ABSTRACT

The excessive bit error rate detection algorithm operates in two modes: BURST mode and non-BURST mode. In non-BURST mode, an alarm state is entered if an error count exceeds a threshold within a set number of frames and exits the alarm state when the error count stays below a threshold for a set number of frames. In the BURST mode, the alarm state is not entered unless the error count exceeds the threshold two consecutive times and does not exit the alarm state unless the error rate remains below a threshold for two consecutive frame counts.

9 Claims, 4 Drawing Sheets

B DENOTES AN 8-BIT BYTE

METHODS AND APPARATUS FOR BURST TOLERANT EXCESSIVE BIT ERROR RATE ALARM DETECTION AND CLEARING

This application is related to co-owned U.S. Pat. No. 5,724,362 entitled "Apparatus and Method Employing a Window Reset for Excessive Bit Error Rate Alarm Detection and Clearing," the complete disclosure of which is incorporated herein by reference.

BACKGROUND OF THE INVENTION

1. Field of the Invention

The present invention relates generally to the field of telecommunications. More particularly, the present invention relates to apparatus and methods for in-service performance monitoring of high speed synchronous digital telecommunications signals.

2. State of the Art

The telecommunications network servicing the United States and the rest of the world is presently evolving from analog transmission to digital transmission with ever-increasing bandwidth requirements. Fiber optic cable has proved to be a valuable tool of such evolution, replacing copper cable in nearly every application from large trunks to subscriber distribution plants. Fiber optic cable is capable of carrying much more information than copper with better noise immunity.

With the advent of fiber optic communications, various standards governing the transport of data have arisen. One standard is commonly known as "SONET"; the "Synchronous Optical Network". Details regarding the SONET standard are set forth in Bellcore document TR-NWT-000253 which is hereby incorporated by reference herein in its entirety, as well as documents referenced therein. In the U.S., SONET standards are based on a synchronous transport signal (STS) and in Europe, SDH (Synchronous Digital Hierarchy) standards are based on a synchronous transport module (STM). The STS and STM signals can be configured to different bit rates and designated as STS-n and STM-n where n is an indication of a bit rate multiple. For example, an STS-3 signal has a bit rate which is three times that of an STS-1 signal and an STM-4 signal has a bit rate which is four times that of an STM-1 signal. Although and STM-1 signal has the same bit rate as an STS-3 signal, the signals contain different frame structures.

As set forth in the Bellcore documents, and as exemplified in prior art FIG. 1 which shows a SONET STS-1 frame, SONET signals are sent in a frame format which includes section overhead and line overhead which together are taken as transport overhead (TOH) arranged as columns of bytes, and a payload which is also arranged as columns of bytes. The bytes of the payload, in turn, include "path layer overhead" (POH) bytes. As seen in prior art FIG. 2 which details the TOH and POH bytes, among the TOH bytes are bytes B1 and B2 which are eight-bit interleave parity (BIP-8) codes. Similarly, the path overhead includes byte B3 which is a BIP-8 code byte. The bit error rate of a line is derived from the sum of BIP-8 for STS-1s in an STS-N. In the case of STM signals, the bit error rate is derived from the sum of BIP-24 of STM-1s in an STM-N. See ITU-T Recommendations G.707, G.708 and G.709.

As set forth in Bellcore document TR-NWT-000253, a user selected BER threshold ranging from $1\times10^{-3}$ to $1\times10^{-9}$ is then used to indicate signal fail (SF) and signal degrade (SD) conditions for the initiation of an automatic protection switching (ASP). (See Section 5.3 of Bellcore TR-NWT-000253). In addition, there is a maximum detection time requirement and an average detection time objective which depend upon the chosen BER level. For example, as set forth in Table 5-2 of Bellcore TR-NWT-000253, the maximum alarm detection time for a BER of $1\times10^{-3}$ is 10 ms, while the maximum detection time for a BER of $1\times10^{-5}$ is one second. The average detection time objective for the BER of $1\times10^{-3}$ is 8 ms, while the average detection time objective for the BER of $1\times10^{-5}$ is 300/N ms or 8 ms, whichever is greater, where N is the level of the STS signal (e.g., N=1 for an STS-1 signal). The algorithm used to detect alarm conditions should also be tolerant to burst errors of up to 3 ms.

In detecting and generating alarm conditions based on the BIP-8 code violations, a sliding window algorithm (SWA) is suggested in Bellcore TR-NWT-000253. In particular, $M_t$ consecutive blocks of data are examined, where $M_t$ equals the maximum number of blocks observed before reinitialization (for alarm). If there are $m_t$ or more blocks (where $m_t$ is a desired flag count threshold number) each having m or more parity violations (where m is a parity violation count threshold) in the $M_t$ blocks, an alarm will be issued. If not, the window of the $M_t$ consecutive blocks is advanced (slid) by a single block, and the calculations are repeated for that set of $M_t$ consecutive blocks. Again, if there are $m_t$ or more blocks each having m or more parity violations, an alarm will be issued. If not, the window is again slid, and the calculations repeated.

In implementing the sliding window algorithm for a window size of N frames, the BIP-8 code violation must be checked for the current frame and the previous N-1 frames, and the previous N-1 BIP-8 code violations must be stored. The requirement of checking the BER every frame, and storing the previous N-1 BIP-8 code violations places a large strain on hardware and/or software implementing the SWA. In fact, in order to meet the BER threshold of $1\times10^{-3}$ with the detection time objective of 8 ms, only hardware or VLSI implementation is feasible. In addition, with the sliding window algorithm, the false alarm rate for declaring a signal degrade or failure is unacceptably high.

Previously incorporated co-owned U.S. Pat. No. 5,724,362 discloses methods and apparatus for generating and clearing an excessive bit error rate (EBER) alarm utilizing a reset window algorithm. The BIP-8 bytes (e.g., B2 bytes) of incoming data blocks (each block being B frames long) of an STSn telecommunications signal are monitored in an "idle state" for code violation counts (CV). Upon receiving a data block having a code violation count meeting or exceeding a code violation count threshold (CVSET), a counter is initialized in a "crossing calculation state", and a window comprising a plurality (W) of blocks is monitored. The counter counts the number of incoming blocks in the window having a CV which meets or exceeds CVSET. If in the crossing calculation state, the count meets or exceeds its own threshold (X), an alarm state is entered and an EBER alarm is set. If not, the system returns to the "idle state". Once in the alarm state, every received block is monitored for its code violation count. The first received block with a CV count of CVCLR (code violation clear) or less initializes a "clearing calculation state" which sets a clearing-counter CC. The clearing counter CC is used to count the number of incoming blocks in the window having a CV of CVCLR or less. If the CC count meets a third threshold value Y within the time window, the alarm is cleared and the system returns to the idle state. Otherwise, the system reverts to the alarm state. The parameters B, W, X, Y, CVSET, and CVCLR are user configurable for expected BER thresholds between $10^{-3}$ and $10^{-9}$. The methods are also applicable to STM-N signals. Although the methods disclosed are generally effective in bursty error conditions, it is not configurable in any particular way for better performance in bursty conditions.

SUMMARY OF THE INVENTION

It is therefore an object of the invention to provide a method for conducting excessive bit error rate (EBER)

alarm generation and clearing which is implementable in hardware, software, or firmware.

It is another object of the invention to provide an EBER alarm generation and clearing algorithm which meets maximum detection time and detection time objective standards.

It is a further object of the invention to provide an EBER alarm generation and clearing algorithm which has a reduced false alarm rate relative to the sliding window algorithm.

It is an additional object of the invention to provide an EBER alarm generation and clearing algorithm which is configurable for expected BERs and for expected bursty errors.

In accord with these objects which will be discussed in detail below, the algorithm of the present invention utilizes the following user configurable variables: a detection threshold (THDV), a detection time base (TBDV), a recovery threshold (THRV), a recovery time base (TBRV), and a burst mode indicator (BURST). The thresholds THDV and THRV are sixteen bit numbers representing a number of BIP violations. The time bases TBDV and TBRV are sixteen bit numbers representing the number of frames in the sampling windows for determining alarm detection and recovery. The BURST indicator is a one bit value indicating whether the burst mode is enabled or disabled. The method steps of the invention include configuring the variables listed above, and maintaining a frame count (FC) and an error count (EC). If BURST=0, an alarm condition is detected when EC≧THDV and FC<TBDV, and an alarm recovery is detected when FC≧TBRV and EC<THRV. If BURST=1, a potential alarm state is detected when EC≧THDV and FC<TBDV and an actual alarm condition is detected when the error count exceeds the threshold a second consecutive time. Similarly, when BURST=1, the alarm recovery is detected only when the EC stays below the recovery threshold for two consecutive recovery time base windows. According to the presently preferred embodiment, the frame counter is adjustable to count frames once every 125 microseconds or once every 500 microseconds. This allows the sampling windows to be as large as 32.768 seconds each.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
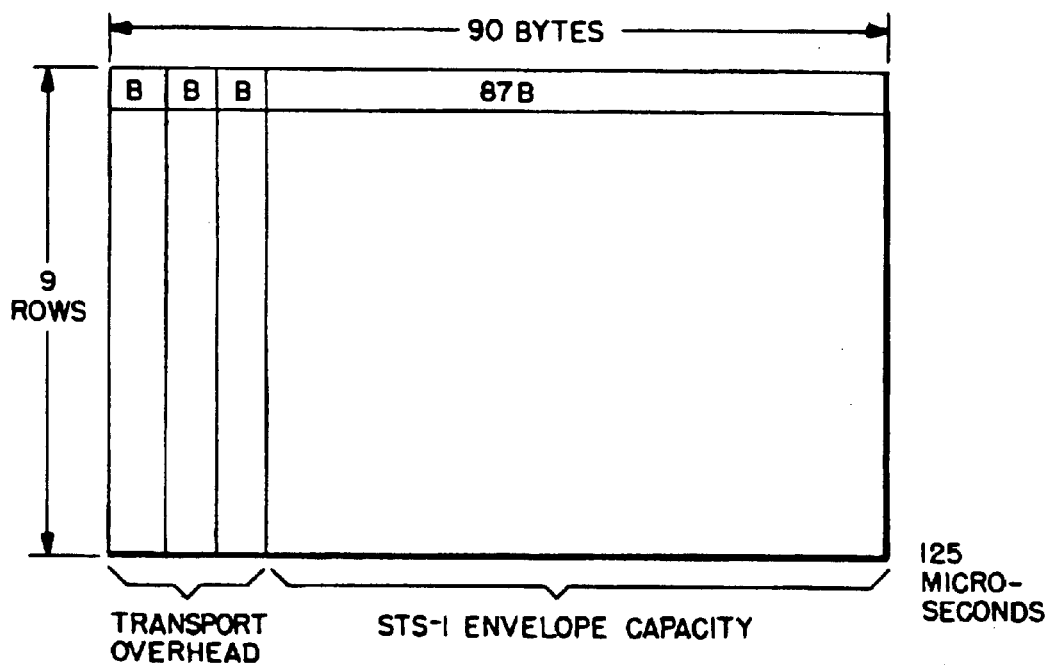
FIG. 1 is a prior art representation of the layout of a SONET STS-1 frame.
Figure 2:
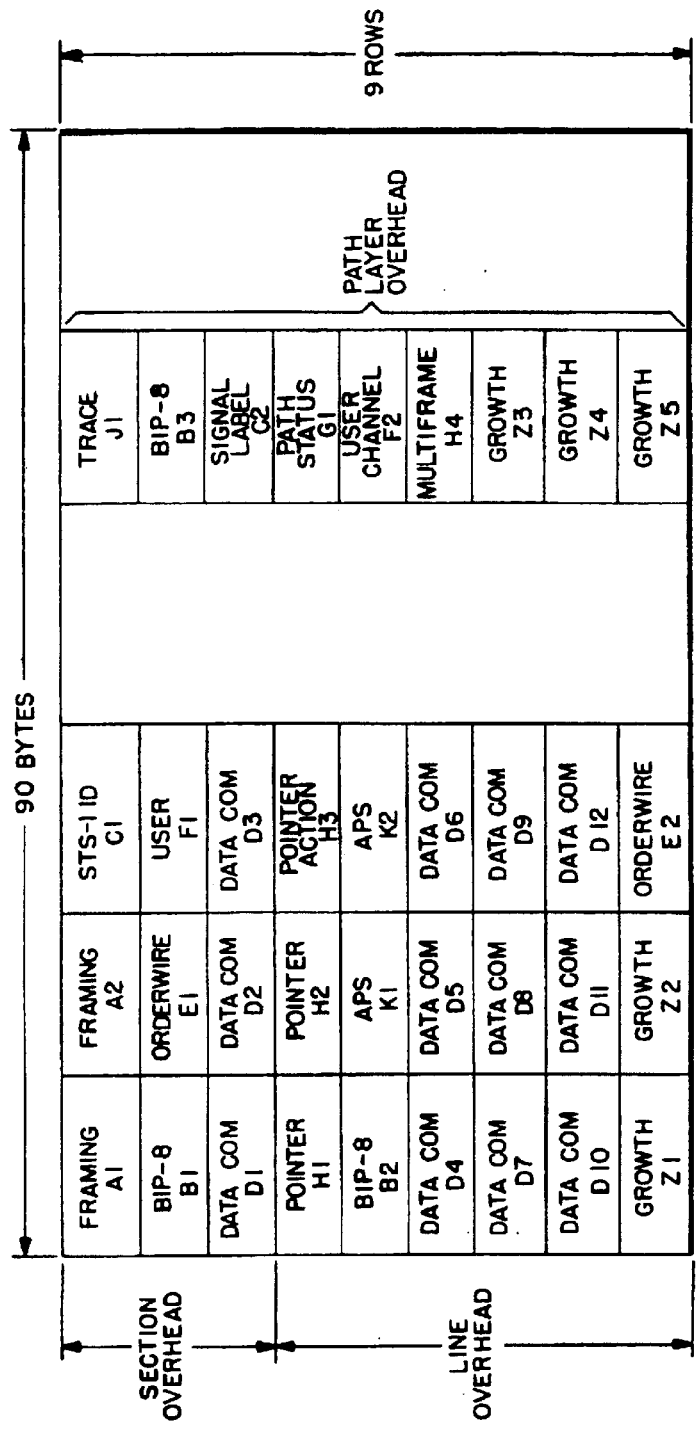
FIG. 2 is a prior art representation of specific bytes in the section, line, and path layer overhead portions of the STS-1 frame of FIG. 1.

The methods of the present invention utilize the following user configurable variables: a detection threshold (THDV), a detection time base (TBDV), a recovery threshold (THRV), a recovery time base (TBRV), and a burst mode indicator (BURST). The thresholds THDV and THRV are preferably sixteen bit numbers representing a number of BIP violations. The time bases TBDV and TBRV are preferably sixteen bit numbers representing the number of frame counts in the sampling windows for determining alarm detection and recovery. The BURST indicator is preferably a one bit value indicating whether the burst mode is enabled or disabled. The method steps of the invention also include maintaining a resettable frame count (FC) and a resettable error count (EC). According to the presently preferred embodiment, the frame count FC is incremented either once every 125 $\mu$s or once every 500 $\mu$s depending on whether a time base bit (TBH) is set. If TBH is set to 1, FC is incremented every 500 $\mu$s and the maximum detection and recover times are $2^{16}*500$ $\mu$s=32.768 seconds.

The detection, recovery and time base thresholds are selected to meet the GR-253-CORE standard switch initiation times for 1.0E-3 through 1.0E-8. To meet this standard, an alarm notification should be provided well before the required switch time in order that the host has ample time to actually perform the switching function. Table 1 illustrates notification times and B2 violations per frame (excluding section overhead) as compared to detection threshold and switch initiation time.

TABLE 1

| Detection Threshold | Required Switch Initiation Time (ms) | Alarm Notification Time (ms) | Number of B2 Violations per Frame |
|---|---|---|---|
| 1.0E-3 | 8 | 1 | 19.224 |
| 1.0E-4 | 13 | 2 | 1.9224 |
| 1.0E-5 | 100 | 16 | 0.19224 |
| 1.0E-6 | 1,000 | 128 | 0.019224 |
| 1.0E-7 | 10,000 | 2,048 | 0.0019224 |
| 1.0E-8 | 83,000 | 16,384 | 0.00019224 |

The GR-253-CORE standard states that for testing with a SONET test set, the distribution of errors should be either periodic or random. Since the algorithm of the invention uses a discrete window, the detection time base counters should be set to one-half the alarm notification time in order to meet the alarm notification time objective. The error detection and time base control registers should be set as shown in Table 2.

TABLE 2

| Desired Threshold | Error Detect (A044e/4f) | Time base Detect (A0450/51) | Number of B2 Violations per Frame | Actual Threshold | Error (difference between actual and desired thresholds) |
|---|---|---|---|---|---|
| 1.0E-3 | 4Ch | 4 h (0.5 ms) | 19 d | 9.8E-4 | 2% |
| 1.0E-4 | 10h | 8 h (0.1 ms) | 2 d | 1.04E-4 | 4% |
| 1.0E-5 | Ch | 40 h (8 ms) | 0.1875 d | 9.7E-6 | 3% |
| 1.0E-6 | Ah | 200 h (64 ms) | 0.0195 d | 1.01E-6 | 1% |

TABLE 2-continued

| Desired Threshold | Error Detect (A044e/4f) | Time base Detect (A0450/51) | Number of B2 Violations per Frame | Actual Threshold | Error (difference between actual and desired thresholds) |
|---|---|---|---|---|---|
| 1.0E-7 | 10h | 2000 h (1024 ms) | 0.00195 d | 1.01E-7 | 1% |
| 1.0E-8 | Ch | 4000 h (8192 ms) | 0.000183 d | 9.5E-9 | 5% |

The last row of Table 2 assumes that TBH is set to 1, i.e. the time base is 500 µs and A0440 =20. If the BER is higher than the programmed threshold, notification will take place within the amount of time listed for the threshold that matches the incoming BER. For example, if the threshold is programmed to monitor for BER at a level of 1.0E-5 (notification in 16 ms or less) but the actual incoming BER is 1.0E-3 then the notification interrupt will be set to 1 ms rather than waiting until the end of the 16 ms window.

Figure 3:
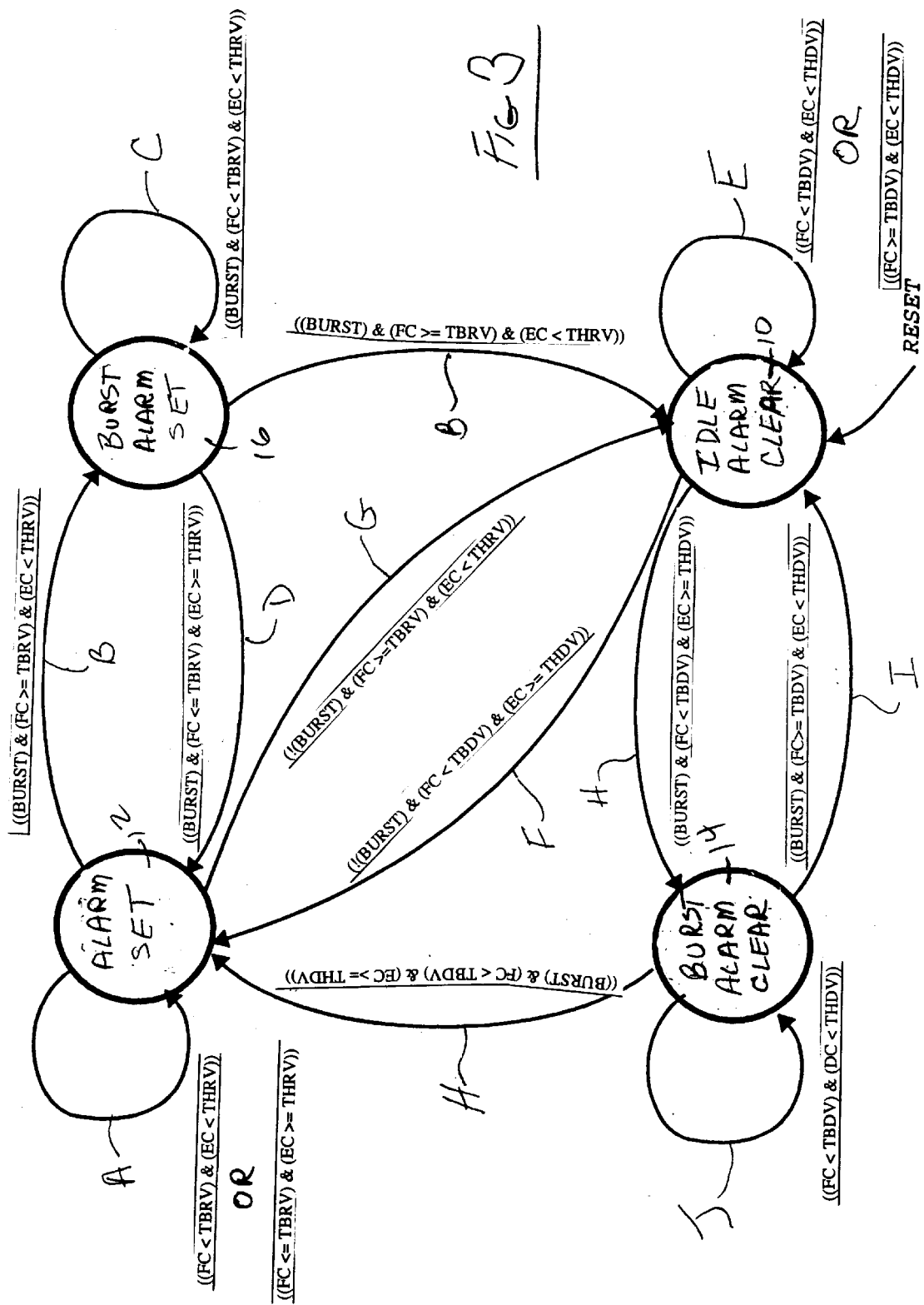
FIG. 3 is a flow chart illustrating the method of the invention for generating and clearing bit error rate alarms.

FIG. 3 illustrates the methods of the invention as a state machine having four states and ten triggers. The states are labeled the idle alarm state 10, the alarm set state 12, the burst alarm clear state 14, and the burst alarm set state 16. The triggers are labelled A–J and are defined in terms of whether or not BURST mode is enabled, a comparison of EC with the detection and recovery thresholds, and a comparison of FC with detection and recovery time base thresholds.

As mentioned above, the operation of the invention is significantly affected by whether or not the BURST bit is set to indicate operation in the BURST mode. When the BURST mode is turned off, the method of the invention is to proceed from an idle alarm clear state 10 to the alarm set state 12 when the error count EC equals or exceeds the threshold THDV before FC reaches the threshold TBDV as indicated by trigger F. Also when burst mode is turned off, recovery from the alarm set state 12 back to the idle alarm clear state 10 is effected when the EC remains below the recovery threshold THRV for at least one full cycle of TBRV as indicated by trigger G.

When the BURST mode is turned on, the method of the invention is to proceed from an idle alarm clear state 10 to a conditional burst alarm clear state 14 when the error count EC equals or exceeds the threshold THDV before FC reaches the threshold TBDV as indicated by trigger H at the lower part of FIG. 3. If, while in the conditional burst alarm clear state 14, the EC drops below the detection threshold THDV during the next consecutive TBDV, the idle alarm clear state 10 is re-entered. If, while in the conditional burst alarm clear state 14, the EC remains above the detection threshold THDV during the next consecutive TBDV, the alarm set state 12 is entered as indicated by trigger H at the left side of FIG. 3. When BURST mode is turned on, recovery from the alarm set state 12 back to the idle alarm clear state 10 is effected via a conditional recovery state, the burst alarm set state 16. More particularly, if the EC drops below the recovery threshold THRV for one full cycle of TBRV, the burst alarm set state 16 is entered as indicated by trigger B at the top of FIG. 3. If, in the burst alarm set state 16, the EC drops below the recovery threshold for the next consecutive recovery period, the idle alarm clear state 10 will be entered as indicated by the trigger B on the right side of FIG. 3. If, in the burst alarm set state 16, the EC rises equal to or greater than the recovery threshold for the next consecutive recovery period, the alarm set state 12 is re-entered as indicated by trigger D. The triggers A, C, E, and J indicate the conditions under which the state machine will remain in states 12, 16, 10, and 14, respectively.

Figure 4:
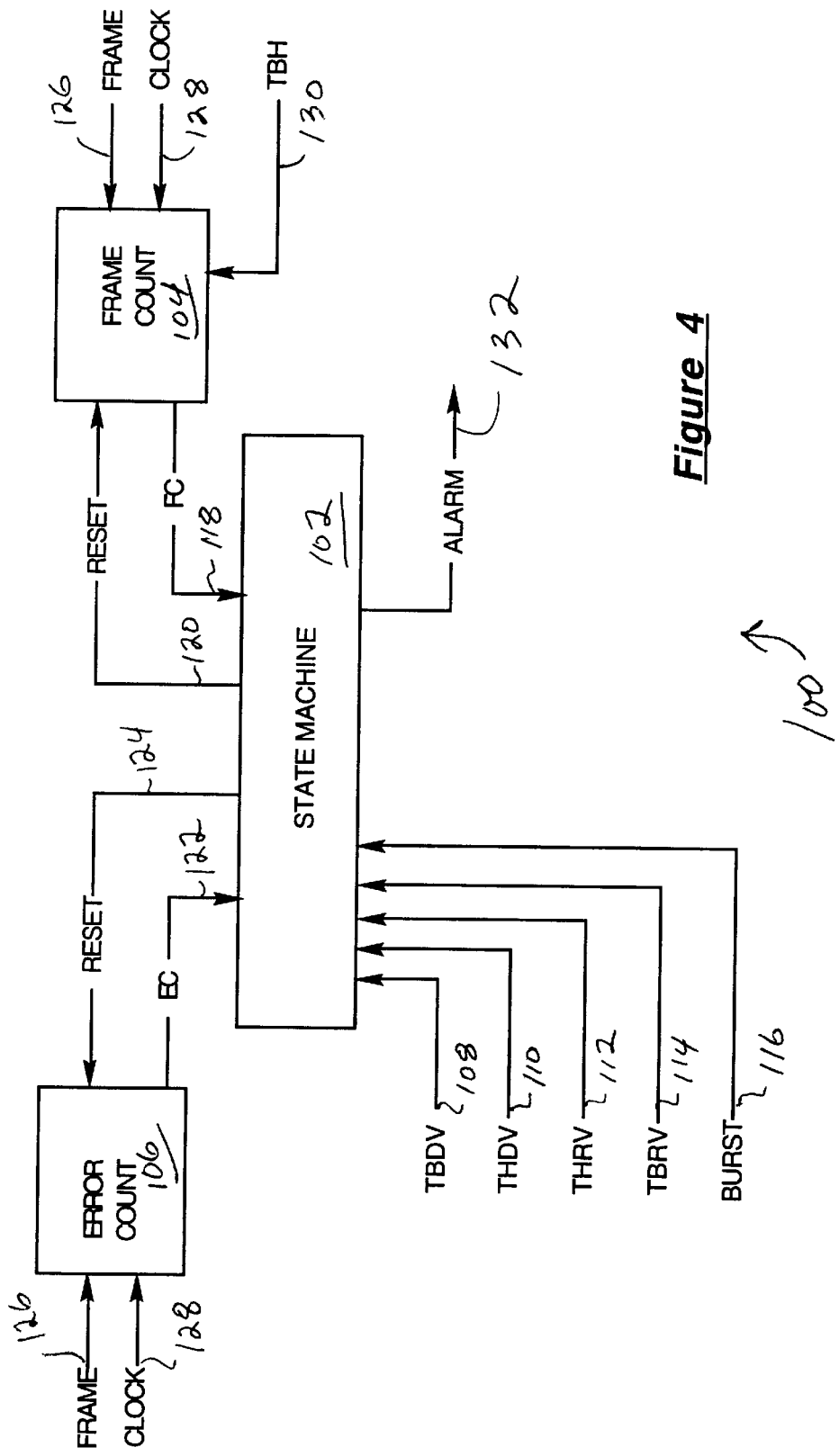
FIG. 4 is a block diagram of an apparatus which generates and clears bit error rate alarms in accord with the method of the invention.

An apparatus 100 for performing the method of the invention is illustrated in FIG. 4. The apparatus 100 includes a state machine 102, a resettable frame counter 104, and a resettable error counter 106. The state machine is coupled to user configurable inputs 108 for TBDV (detection time base), 110 for THDV (detection threshold), 112 for THRV (recovery threshold), 114 for TBRV (recovery time base), and 116 for BURST (burst mode setting). The state machine 102 receives frame counts 118 from the frame counter 104 and resets the frame counter 104 via a reset line 120. Error counts 122 are provided to the state machine 102 from the error counter 106 which is reset by the state machine 102 via the reset line 124. Both the frame counter 104 and the error counter 106 receive input from the STS/STM frame 126 and clock 128. The frame counter 104 also receives user configurable input 130 for TBH (time base), the one bit indicator which indicates whether the frame count should be incremented once every 125 µs or once every 500 µs. As illustrated, the state machine also has an alarm output 132.

From the foregoing, those skilled in the art will appreciate that the apparatus 100 may be embodied as hardware, software, or a combination of hardware and software. According to the presently preferred embodiment, the apparatus is embodied as firmware using an ASIC (application specific integrated circuit) or an FPGA (field programmable gate array).

There have been described and illustrated herein several embodiments of methods and apparatus for generating an excessive bit error rate alarm for an STSn or an STMN signal. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. A method for generating an excessive bit error rate (EBER) alarm for an STSn or STMn telecommunications signal, said STSn or STMn telecommunications signal having a frame, said method comprising:
   a) counting bit errors over a preset detection period of time;
   b) comparing the total count of errors during the preset detection period of time to a detection threshold value;
   c) when the total count exceeds the detection threshold value,
      i) if a burst mode indicator is not set, entering an alarm state and generating an alarm, and
      ii) if a burst mode indicator is set, repeating steps "a)" and "b)" until the total count exceeds the detection threshold for a plurality consecutive detection period before entering an alarm state and generating an alarm.

2. A method according to claim 1, further comprising:

d) in an alarm state, counting bit errors over a preset recovery period of time;

e) comparing the total count of errors during the preset recovery period to a recovery threshold value;

f) when the total count is less than the recovery threshold value,
   i) if a burst mode indicator is not set, exiting the alarm state and canceling the alarm, and
   ii) if a burst mode indicator is set, repeating steps "d)" and "c)" until the total count is less than the recovery threshold for a plurality consecutive recovery periods before exiting the alarm state and canceling the alarm.

3. A method according to claim 1, further comprising:

prior to step "a)", d) setting the detection period, the detection threshold and the burst mode indicator based on the expected occurrence of bit errors.

4. A method according to claim 2, further comprising:

prior to step "a)", g) setting the detection period, the detection threshold, the recovery period, the recovery threshold and the burst mode indicator based on the expected occurrence of bit errors.

5. A method according to claim 1, wherein:

said detection period of time is a preset frame count value.

6. A method according to claim 5, wherein:

the frame count is incremented every 125 $\mu$s.

7. A method according to claim 5, wherein:

the frame count is incremented every 500 $\mu$s.

8. An apparatus for generating an excessive bit error rate (EBER) alarm for an STSn or STMn telecommunications signal, the STSn or STMn telecommunications signal having a frame, said apparatus comprising:

a) detection time base means for determining a repeating detection period;

b) error counter means for counting bit errors of the signal and providing a bit error value;

c) burst mode detection means for determining whether the apparatus is operating in a burst mode; and d) a state machine coupled to said detection time base means, said error counter means and said burst mode detection means, wherein
   i) when said burst mode detection means detects that the apparatus is not operating in a burst mode,
      said state machine generates an alarm when the bit error value is greater than or equal to a detection threshold during a detection period, and
   ii) when said burst mode detection means detects that the apparatus is operating in a burst mode,
      said state machine generates an alarm when the bit error value is greater than or equal to a detection threshold during two consecutive detection periods.

9. An apparatus according to claim 8, further comprising:

g) recovery time base means for determining a repeating recovery period; and h) recovery detection means coupled to said recovery time base means and said error counter means for determining whether the bit error value is less than a recovery threshold during a recovery period, wherein
   i) when said burst mode detection means detects that the apparatus is not operating in a burst mode,
      said state machine cancels an alarm when said recovery detection means determines that the bit error value is less than a recovery threshold during a recovery period, and
   ii) when said burst mode detection means detects that the apparatus is operating in a burst mode,
      said state machine cancels an alarm when said recovery detection means determines that the bit error value is less than a recovery threshold during two consecutive recovery periods.

* * * * *